(12) United States Patent
La Pegna et al.

(10) Patent No.: US 9,638,165 B2
(45) Date of Patent: May 2, 2017

(54) BLADE FOR WIND TURBINE AND METHOD OF ASSEMBLY OF THE BLADE

(71) Applicant: ENEL GREEN POWER, S.p.A., Rome (IT)

(72) Inventors: Luigi La Pegna, Rome (IT); Renzo Piano, Rome (IT)

(73) Assignee: ENEL GREEN POWER, S.P.A., Rome (IT)

(*) Notice: Subject to any disclaimer, the term of this patent is extended or adjusted under 35 U.S.C. 154(b) by 465 days.

(21) Appl. No.: 14/348,242

(22) PCT Filed: Sep. 28, 2012

(86) PCT No.: PCT/EP2012/069200
§ 371 (c)(1),
(2) Date: Mar. 28, 2014

(87) PCT Pub. No.: WO2013/045622
PCT Pub. Date: Apr. 4, 2013

(65) Prior Publication Data
US 2014/0234119 A1    Aug. 21, 2014

Related U.S. Application Data

(60) Provisional application No. 61/548,078, filed on Oct. 17, 2011.

(30) Foreign Application Priority Data

Sep. 30, 2011   (IT) .............................. RM2011A0517

(51) Int. Cl.
*F03D 1/06*    (2006.01)
(52) U.S. Cl.
CPC ......... *F03D 1/0675* (2013.01); *F03D 1/0608* (2013.01); *F03D 1/0633* (2013.01);
(Continued)

(58) Field of Classification Search
CPC ..... F03D 1/0675; F03D 1/0608; F03D 1/0633
(Continued)

(56) References Cited

U.S. PATENT DOCUMENTS 5,042,968 A * 8/1991 Fecto .................... B29C 44/16
416/226
8,529,212 B2 * 9/2013 Smith et al. ......... F04D 25/088
416/226

(Continued)

FOREIGN PATENT DOCUMENTS

DE          4442628 A1    6/1996
DE         29717984 U1    1/1998
(Continued)

*Primary Examiner* — Kevin Lee
(74) *Attorney, Agent, or Firm* — Thomas Horstemeyer, LLP

(57) ABSTRACT

It is described a blade for a wind turbine for converting wind energy into electric energy, including: a blade structure longitudinally extending along a blade axis (X1) and including a blade tip, an opposite blade root, a longitudinal leading edge portion and a longitudinal trailing edge portion which are extended between the blade root and the blade tip; and an outer aerodynamic shell defining an airfoil including an airfoil leading edge, an airfoil trailing edge and an airfoil suction side and an airfoil pressure side between the airfoil leading and trailing edges. The outer aerodynamic shell includes a suction side panel and a pressure side panel which are made from a transparent material and are fastened to the blade structure so as to define the airfoil suction side and the airfoil pressure side, respectively, wherein the blade includes a transparent region between the transparent panels and wherein the transparent panels are arranged facing one another so that it is possible to see through the blade looking through the transparent panels and the transparent region. A method for assembling the blade is also described.

14 Claims, 7 Drawing Sheets

(52) U.S. Cl.
CPC ....... *F05B 2240/302* (2013.01); *Y02E 10/721* (2013.01); *Y10T 29/49337* (2015.01)

(58) Field of Classification Search
USPC ........................................................ 416/226
See application file for complete search history.

(56) References Cited

U.S. PATENT DOCUMENTS

| | | |
|---|---|---|
| 2007/0217918 A1 | 9/2007 | Baker |
| 2011/0215585 A1 | 9/2011 | Caires |
| 2013/0064674 A1* | 3/2013 | Hunter et al. .......... B64C 27/32 |
| | | 416/226 |
| 2014/0241895 A1* | 8/2014 | Yerramalli et al. ... F03D 1/0675 |
| | | 416/226 |

FOREIGN PATENT DOCUMENTS

| | | |
|---|---|---|
| EP | 1830062 A1 | 9/2007 |
| WO | 9703287 A1 | 1/1997 |
| WO | 2007140771 A1 | 12/2007 |
| WO | 2009126312 A2 | 10/2009 |

* cited by examiner

BLADE FOR WIND TURBINE AND METHOD OF ASSEMBLY OF THE BLADE

CROSS-REFERENCE TO RELATED APPLICATION

This application is the 35 U.S.C. §371 national stage of PCT Application No. PCT/EP2012/069200, filed Sep. 28, 2012, which is herein incorporated by reference in its entirety and which also claims priority to, and the benefit of, U.S. patent application 61/548,078, filed Oct. 17, 2011; and Italian patent application RM2011A000517, filed Sep. 30, 2011, both which are herein incorporated by reference in its entirety.

BRIEF SUMMARY OF THE INVENTION

The present description refers to the technical field of the production of electric energy and in particular it concerns a blade for a wind turbine generator and a method for assembling such a blade.

Renewable energy sources are increasingly widely used for the production of electric energy. In the field of renewable energy, there is currently particular interest in the conversion of wind energy into electric energy. Such conversion takes place by means of suitable electromechanical machines, called wind turbine generators, capable of transforming the kinetic energy of the wind into electric energy ready to be entered into an electric network. It is possible to distinguish wind turbine generators of two different types, in particular wind turbine generators with vertical axis and wind turbine generators with horizontal axis.

Wind turbine generators with horizontal axis, currently more common than those with vertical axis, generally comprise a vertical support structure, an orientable nacelle pivotably hinged to the top of the vertical support structure, a wind rotor comprising a group of blades fixed to a hub, a rotary shaft connected to the hub and an electric alternator housed inside the nacelle and suitable for converting the rotational mechanical energy of the shaft into electric energy. The wind rotor through the effect of the wind intercepted by the group of blades is such as to rotate around a generally horizontal axis, or slightly inclined to an exactly horizontal axis, to set the rotary shaft in rotation.

Wind turbine generator technology undoubtedly has various advantageous aspects, particularly in terms of reduction of environmental pollution, at least at local level. However, wind energy has the drawback of being an intermittent energy source and of providing from the outset relatively low power concentrations if compared for example with those provided by fossil fuels. For this reason, wind turbine generators are usually equipped with blades even many meters in length and are very often grouped together in so-called wind farms that are made in suitably selected locations, for example based on the average annual wind strength values of each location. In practice, each wind farm generally comprises multiple wind turbine generators that are typically installed in natural environments, like for example hills, mountaintops or in open sea. Very often, due to the number of wind turbine generators installed inside a wind farm and the relatively large dimensions of the individual wind turbine generators, they are thus accused of disturbing the countryside or in any case of having a negative visual impact on the surrounding environment. This currently represents one of the main obstacles to the spread of such technology.

In order to at least partially solve the above problems some technical solutions are known.

For example United States patent application published with number US 2011/0215585 describes a wind tower turbine system which is provided with completely transparent rotor blades. Particularly, such rotor blades are each made by coupling two rotor blade half shells made from a transparent material with a support structure of the blade. Each rotor blade half shell is extended continuously from an airfoil leading edge to an airfoil trailing edge in such a way that the two rotor blade half shells completely define, respectively, the pressure side and the suction side of an airfoil of the rotor blade.

German patent application published with number DE 4442628 describes a blade for a wind turbine generator, such a blade being made from a transparent plastic which can be reinforced by means of glass fibres or by means of a metal grill.

A general objective of the present description is to provide an alternative blade for a wind turbine generator that is such as to at least partially avoid the drawbacks described above with reference to the prior art.

This and other objectives are achieved through a blade for a wind turbine generator as defined in claim 1 in its most general form, and in the claims dependent on it in some particular embodiments.

A further objective of the present description is to provide a wind turbine generator as defined in claim 10.

A further objective of the present description is to provide a method for assembling a blade for a wind turbine generator as defined in claim 11 in its general embodiment, and in the claims dependent on it in some particular embodiments.

BRIEF DESCRIPTION OF THE DRAWINGS

The invention will become clearer from the following detailed description of embodiments thereof, given as an example and therefore in no way limiting in relation to the attached drawings, in which.

In the attached figures, elements that are the same or similar will be indicated by the same reference numerals.

DETAILED DESCRIPTION OF THE INVENTION

Figure 1:
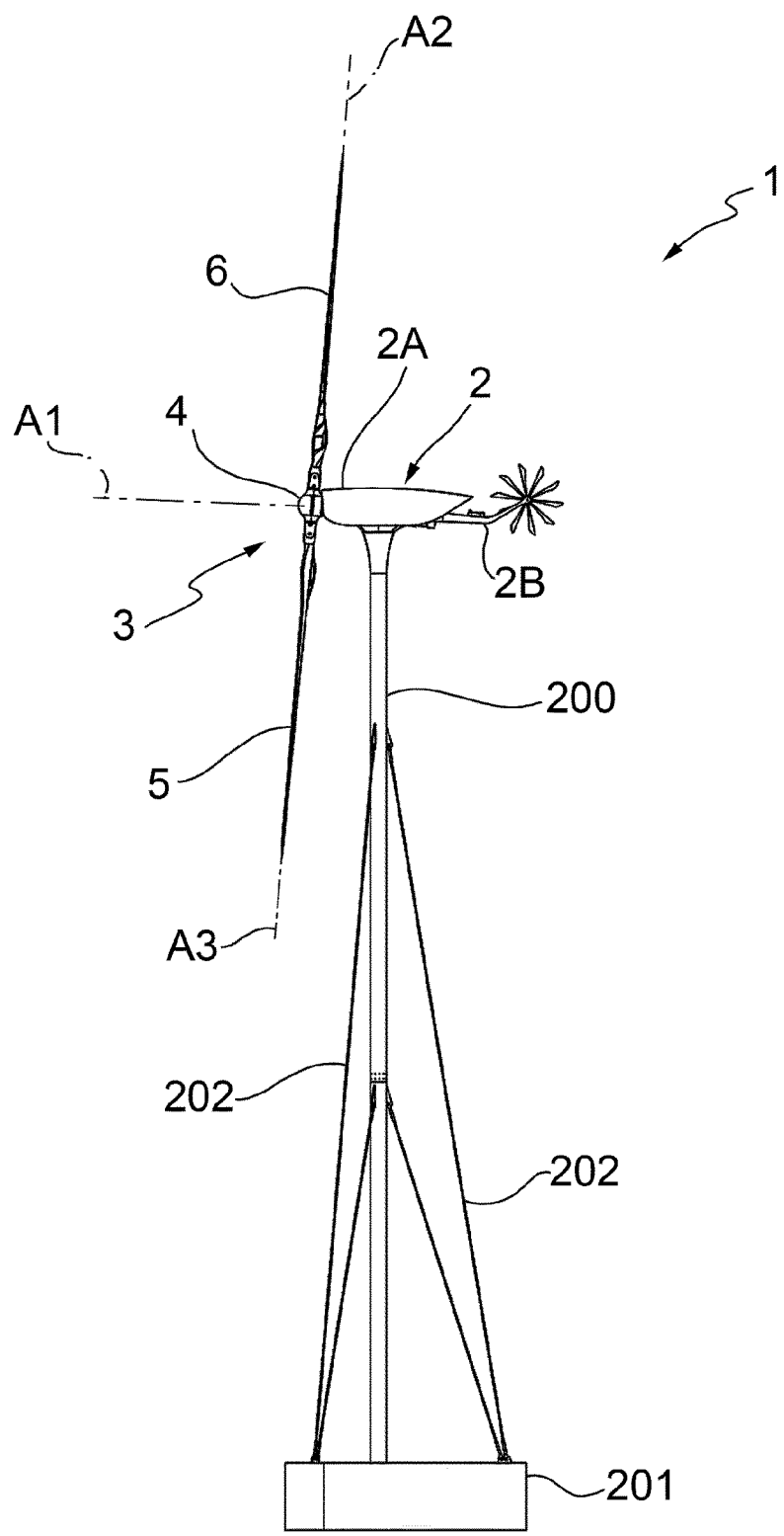
FIG. 1 shows a raised side plan view of a wind turbine generator according to a currently preferred embodiment.

With reference to FIG. 1, a non-limiting embodiment of a wind turbine generator to convert wind energy into electric energy is shown, globally indicated with 1. In the example, the wind turbine generator 1 is in particular a wind turbine generator with horizontal axis.

In accordance with an embodiment, without for this reason introducing any limitation, the wind turbine generator 1 is a so-called mini-wind turbine generator since it is able to develop an electric power of less than 200 kW, for example equal to about 50-60 kW.

The wind turbine generator 1 comprises a support tower 200 that in the example represented is fixed to a steelwork support base 201 and it is secured to it through a plurality of cables 202, for example made from steel. The support base 201 is for example suitable for being buried so that an upper face thereof is flush with the level of the ground.

The wind turbine generator 1 also comprises a nacelle 2 comprising a head portion 2A and a tail portion 2B. The nacelle 2 is fixed to the top of the support tower 200 and is for example pivotably hinged to it, so as to be able to be oriented in a controllable manner, for example through a servomotor (not represented in the figures).

In accordance with a preferred embodiment in the nacelle 2 a housing space is defined suitable for housing some of the mechanical, electrical and electromechanical components of the wind turbine generator 1.

The wind turbine generator 1 comprises a primary wind rotor 3 pivotable with respect to the nacelle 2 around a primary rotation axis A1. The primary wind rotor 3 includes a fastening hub 4 or ogive 4 projecting from the head portion 2A of the nacelle 2, and a pair of blades 5, 6 pivotably mounted with respect to the fastening hub each around a respective rotation axis A2, A3. In the example, the rotation axes A2, A3 extend in the radial or essentially radial direction with respect to the primary rotation axis A1.

In a per sé known way the wind turbine generator 1 also comprises a primary shaft (not represented in the figures) that is suitable for being set in rotation by the primary wind rotor 3 and that is supported in rotation around the primary rotation axis A1. Such a primary shaft is also connected or operatively connected in a per sé known way to at least one electric generator (not represented in the figures) that is preferably housed in the nacelle 2 and that is such as to convert the wind energy intercepted by the blades 5, 6 into electric energy.

Figure 2:
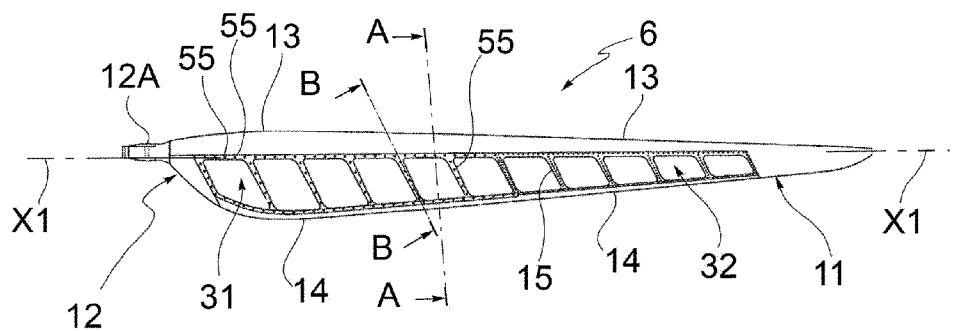
FIG. 2 shows a front plan view of a blade of the wind turbine generator of FIG. 1 according to a currently preferred embodiment.

With reference to FIG. 2 one of the blades 5, 6 is illustrated according to a currently preferred embodiment. Specifically, FIG. 2 illustrates just the blade 6, however it should be noted that the blades 5, 6 are structurally identical to one another and therefore the characteristics that will be described hereafter in relation to the blade 6 will be valid, mutatis mutandis, also for the blade 5.

As can be observed in FIG. 2, the blade 6 extends longitudinally along a blade axis X1. In accordance with a preferred embodiment, when the blade 6 is mounted on the fastening hub 4, the blade axis X1 preferably coincides with the rotation axis A2. The blade 6 has a suction side or suction side face that can be seen for example in FIG. 2, and an opposite pressure side or pressure side face.

Figure 4:
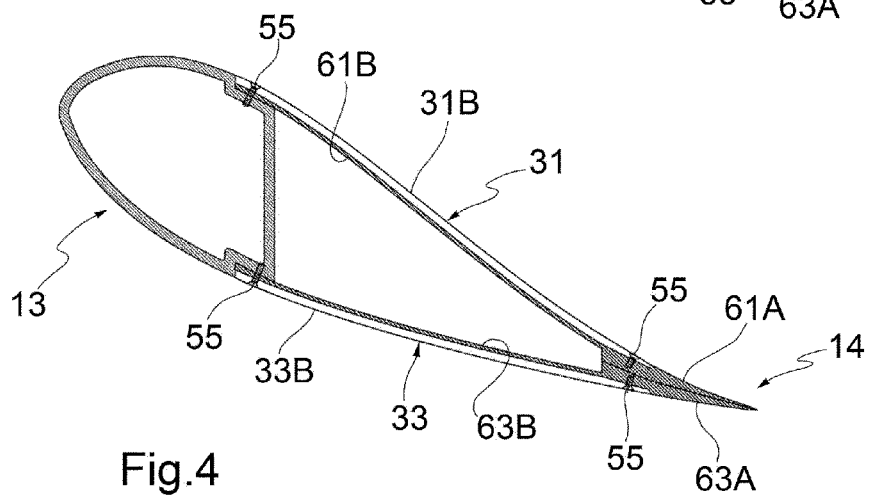
FIG. 4 shows a section view of the blade of FIG. 2 along the line B-B of FIG. 2.
Figure 7:
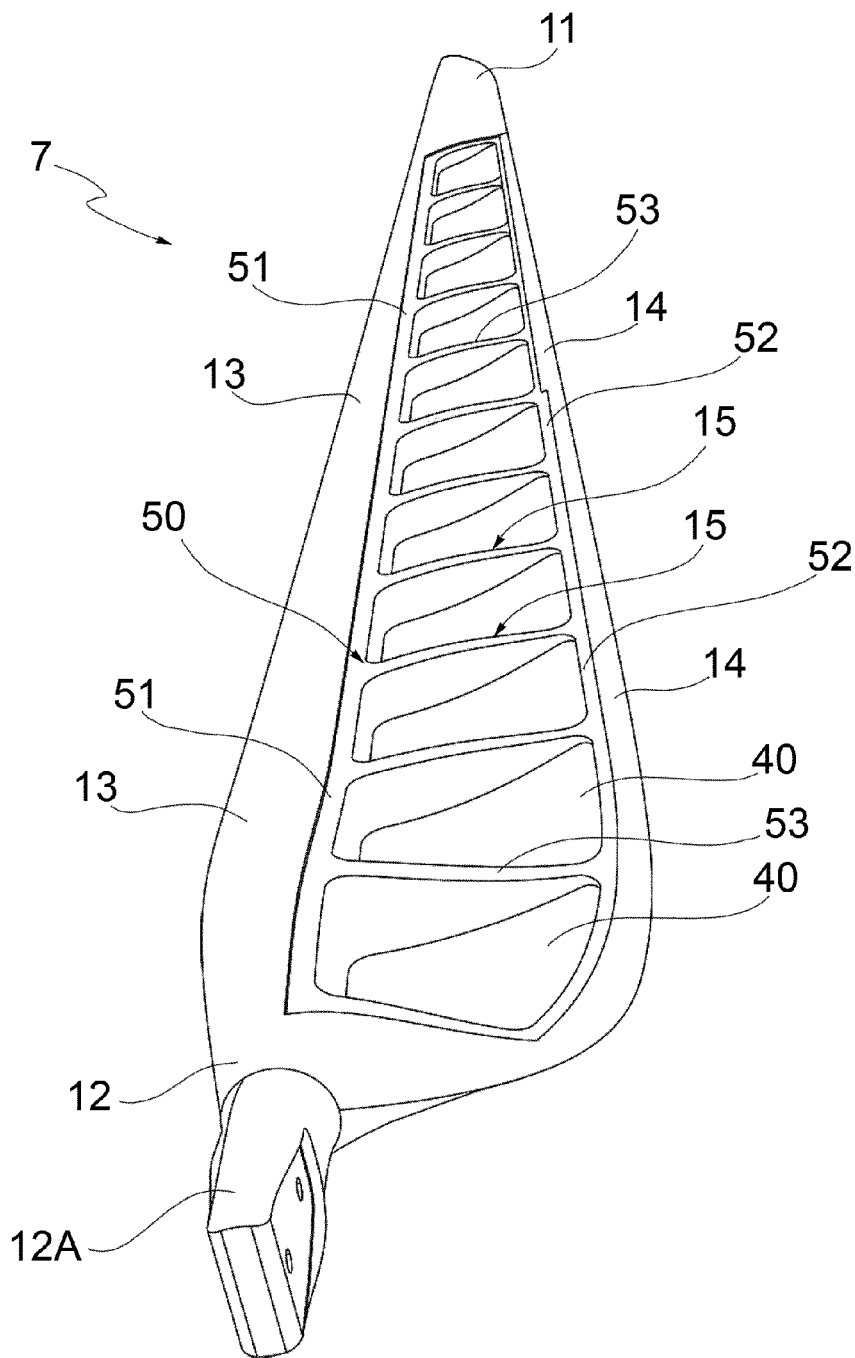
FIG. 7 shows a perspective view of the blade of figure in which some components of the blade have been removed.

With reference to FIG. 7, in accordance with a preferred embodiment the blade 6 comprises a blade structure globally indicated with 7 longitudinally extending along the blade axis X1. The blade structure 7 comprises a blade tip 11, or blade tip portion 11, and an opposite blade root 12, or base portion 12. In the example the blade root 12 comprises a fastening portion 12A, or blade hub 12A, to fix the blade 6 to the fastening hub 4. Moreover, the blade structure 7 comprises a longitudinal leading edge portion 13, which is associated with or connected to the longitudinal leading edge of the blade 6, and a longitudinal trailing edge portion 14, which is associated with or connected to the longitudinal trailing edge of the blade 6. The longitudinal leading and trailing edge portions 13, 14 extend longitudinally between the blade tip 11 and the blade root 12. Preferably, the blade structure 7 also comprises a plurality of reinforcement ribs 15 that are spaced apart in the direction of the blade axis X1 and extend transversally to such an axis X1 between the longitudinal leading edge portion 13 and the longitudinal trailing edge portion 14. In the example the blade 6 comprises, in a non-limiting way, twelve reinforcement ribs 15. FIG. 4 represents a cross section view of the blade 6 along the line B-B at one of the reinforcement ribs 15. Preferably and not for limiting purposes the blade structure is made entirely or almost entirely with a composite carbon fibre material.

Figure 3:
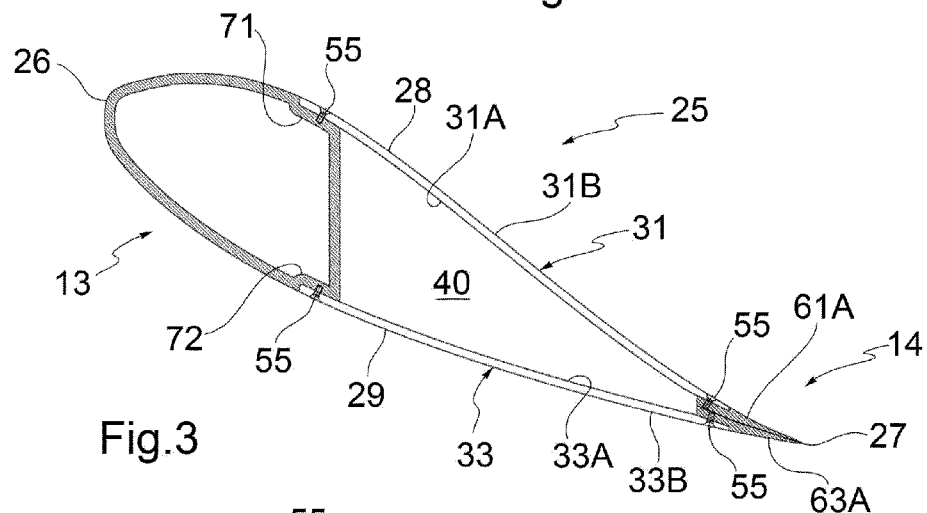
FIG. 3 shows an airfoil of the blade of FIG. 2, corresponding to a section of the blade along the line A-A of FIG. 2.
Figure 5:
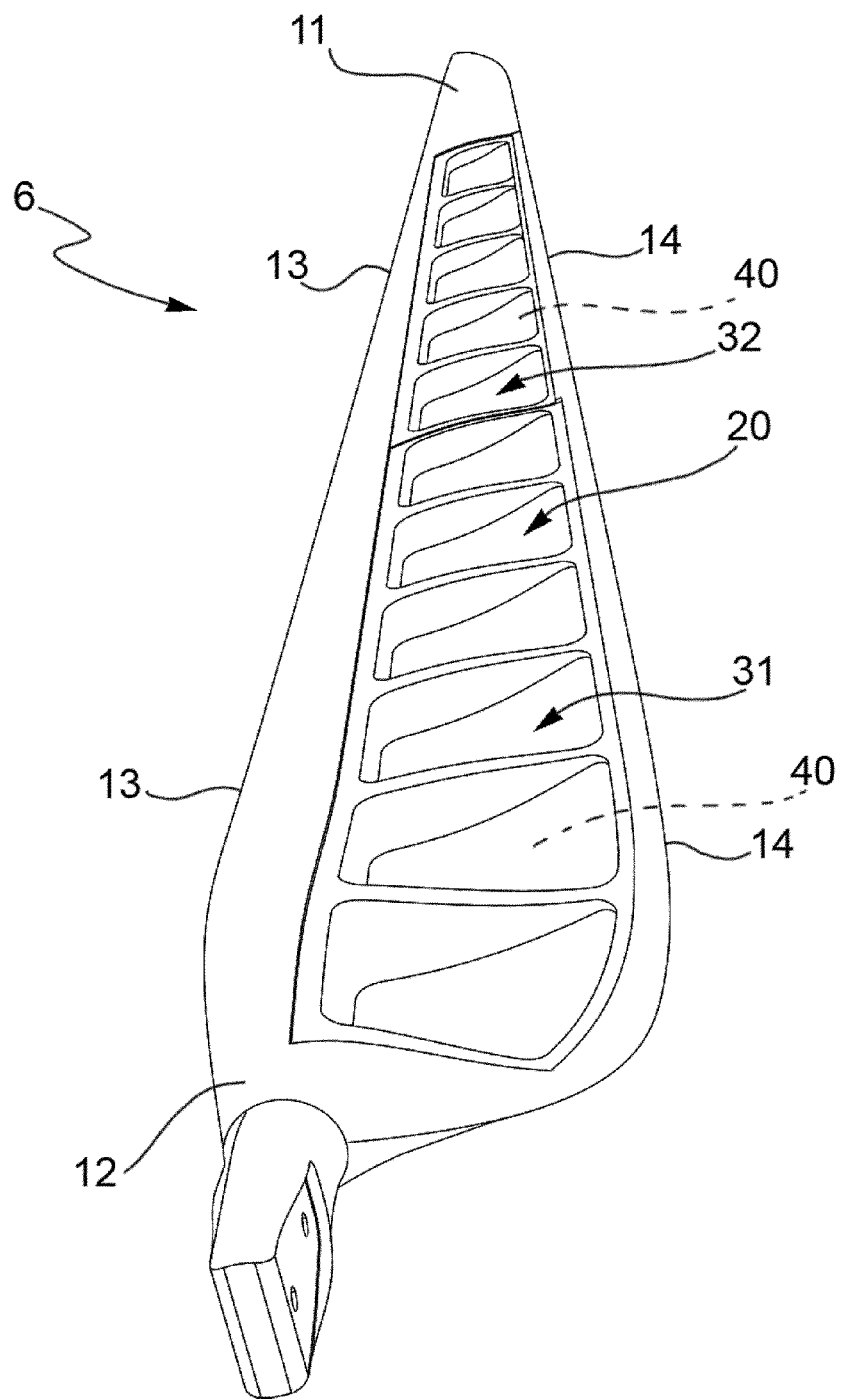
FIG. 5 shows a perspective view of the blade of FIG. 2.

With reference to FIG. 5, the blade 6 comprises an outer aerodynamic shell 20 that defines an airfoil globally indicated with 25 in FIG. 3. With reference to FIG. 3, which shows a cross section view of the blade 6 along the line A-A of FIG. 2, it can be seen that the airfoil 25 comprises an airfoil leading edge 26 and an airfoil trailing edge 27. Moreover, the airfoil 25 comprises an airfoil suction side 28 and an airfoil pressure side 29 between the aforementioned airfoil leading and trailing edges 26, 27. It should be observed that FIG. 3 represents just one airfoil of the blade 6. However, it is clear that the outer aerodynamic shell 20 defines a plurality of airfoils along the longitudinal extension of the blade 6. Concerning this, it should be observed that for the purposes of the present description the terms "longitudinal leading edge" and "longitudinal trailing edge" referring to the blade 6 respectively indicate the set of airfoil leading edges and the set of airfoil trailing edges of the plurality of airfoils of the blade 6. Moreover, it should be observed that since in accordance with a currently preferred embodiment the blade 6 is a twisted blade, such airfoils are variously rotated with respect to one another around the blade axis X1.

Figure 6:
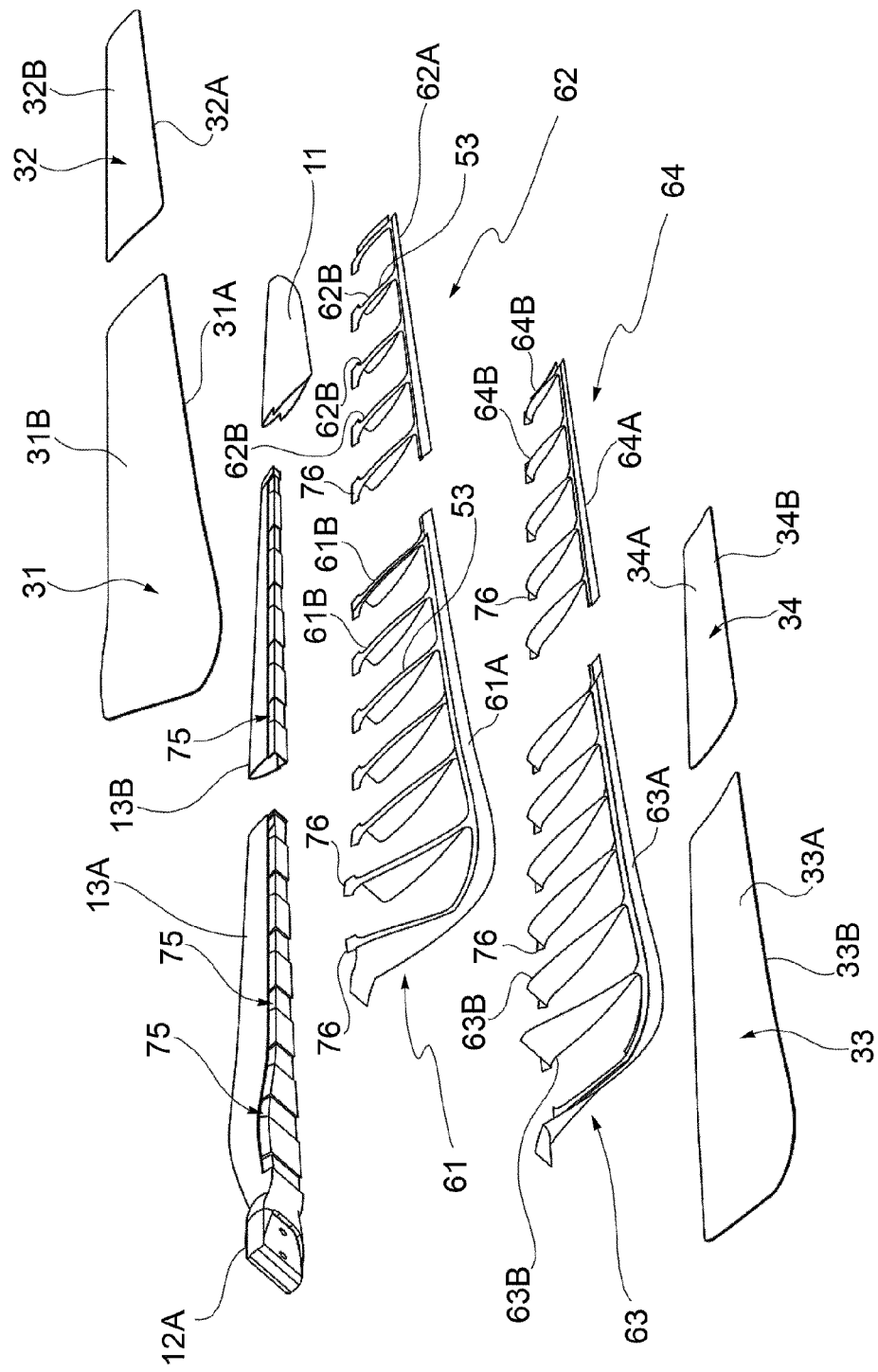
FIG. 6 shows an exploded perspective view of the blade of FIG. 2.

With reference to FIGS. 5 and 6, according to a preferred embodiment the blade 6 comprises a pair of suction side panels 31, 32 and a pair of pressure side panels 33, 34 that are fixed to the blade structure 7 so as to at least partially define the aerodynamic shell 20. According to a preferred embodiment the suction side panels 31, 32, and similarly the pressure side panels 33, 34 are adjacent in the direction of the blade axis X1 and extend for a significant portion of the longitudinal extension of the blade. For example, according to a preferred embodiment such panels extend for at least half of the length of the blade 6, and more preferably for about two thirds of the length of the blade 6. In accordance with a preferred embodiment the thickness of the suction side and pressure side panels is variable in the direction of longitudinal extension of the blade 6. More preferably, such a thickness decreases for example from the blade root 12 towards the blade tip 11. Each of such suction side and pressure side panels comprises an inner face 31A, 32A, 33A, 34A and an opposite outer face 31B, 32B, 33B, 34B. The suction side and pressure side panels are arranged mutually adjacent so as to at least partially define the suction side and the pressure side, respectively, of the airfoils of the blade 6. For example with reference to FIG. 3, it can be seen that the suction side panel 31 and the pressure side panel 33 are arranged facing to one another and respectively partially define the suction side 28 and the pressure side 29 of the airfoil 25. More particularly, with reference to FIG. 3, it can be seen that the suction side panel 31 and the pressure side panel 33 are arranged facing to one another and respectively only partially define the suction side 28 and the pressure side 29 of the airfoil 25.

With reference to FIG. 7, in which the blade 6 is represented with all of the suction side and pressure side panels 31-34 removed from the blade structure 7, it can be seen that in accordance with a preferred embodiment the blade structure 7 defines a plurality of transparent regions 40 which are arranged adjacent to one another in the direction of the blade axis X1. More specifically, in the example the blade structure 7, not for limiting purposes, defines eleven transparent regions 40, each of which is delimited preferably between a pair of adjacent reinforcement ribs 15 and between the aforementioned longitudinal leading and trailing edge portions 13, 14. In other words, in the example the blade structure 7 delimits a plurality of windows 40, or through openings 40, each of which preferably has a generally quadrangular shape.

Going back to FIG. 6, advantageously the suction side panels 31, 32 and the pressure side panels 33, 34 are made from a transparent material. By transparent material we mean a material essentially transparent to sunlight and essentially colourless. In other words, by transparent material we mean a material that is such as to provide a visual effect similar to that provided by a common glass window used normally in homes. According to a preferred and non-limiting embodiment the suction side panels 31, 32 and the pressure side panels 33, 34 are made through sheets of polycarbonate that have preferably been hot shaped. In the example, a plurality of transparent regions 40 is arranged between each pair 31, 33 and 32, 34 of the aforementioned mutually faced transparent panels. More specifically, in the example six transparent regions 40 are arranged between the pair of transparent panels 31, whereas five transparent regions 40 are arranged between the pair of transparent panels 32, 34. In this way, for example looking through the pair of facing transparent panels 31, 33 and through the transparent regions 40 arranged between such panels 31, 33 it is possible to see through the blade 6. Similarly, looking for example through the pair of facing transparent panels 32, 34 and through the transparent regions 40 arranged between such panels 32, 34 it is possible to see through the blade 6

Going back to FIG. 7, in accordance with a preferred embodiment the blade structure 7 comprises a suction side fastening seat 50 situated on the suction side of the blade 6 to fix the suction side panels 31, 32 to the blade structure 7. The fastening seat 50 preferably comprises a fastening surface 51, 52, 53 that is set back towards the inside of the blade 6 with respect to the outer aerodynamic shell 20. The fastening surface 51-53 faces towards the inner faces 31A, 32A of the suction side panels and is fixed to such inner faces 31A, 32A. As can be seen in FIG. 7 the fastening surface 51-53 comprises two longitudinal surface portions 51, 52 that extend between the blade tip 11 and the blade root 12 and that are associated with or connected to the longitudinal leading edge portion 13 and to the longitudinal trailing edge portion 14, respectively. Preferably, the fastening surface 51-53 also comprises a plurality of transversal surfaces 53 that extend transversally with respect to the blade axis X1 between the longitudinal surface portions 51, 52. On the pressure side of the blade 6 the blade structure 7 also comprises a pressure side fastening seat (not represented in the figures) to fix the pressure side panels 33, 34 to the blade structure 7. The pressure side fastening seat is analogous to the suction side fastening seat 50. Moreover, the pressure side panels 33, 34 are fixed to the pressure side fastening seat in an analogous way to the fastening of the suction side panels 31, 32 to the suction side fastening seat 50. For this reason, the pressure side fastening seat and fastening the pressure side panels 33, 34 to the pressure side fastening seat are not described any further in detail hereafter.

In accordance with a preferred embodiment, the blade 6 comprises a first and a second type of fastening elements that are different to one another to fix the transparent panels 31, 32 and 33, 34 to the respective suction side and pressure side fastening seats. More specifically, the fastening elements of the first type comprise a glue or an adhesive substance whereas the fastening elements of the second type preferably comprise screws or other equivalent fastening elements. In the example, in which the blade structure 7 is made from carbon fibre, the fastening elements of the first type preferably comprise an epoxy resin whereas the fastening elements of the second type preferably comprise a plurality of screws 55 (FIGS. 2-4) preferably screwed in a corresponding plurality of mother screws (not represented in the figures) that are embedded in the blade structure 7. In any case, it should be observed that in general it is not strictly necessary to use fastening elements of a first and a second type that are different to one another to fix the aforementioned transparent panels 31-34 to the blade structure 7. For example, in accordance with alternative embodiments, the transparent panels could be fixed to the blade structure either exclusively through an adhesive substance or exclusively through screws or other equivalent fastening elements. However, it should be noted that the fact that a first type of fastening elements comprising an adhesive substance and a second type of fastening elements different from the first type of fastening elements are used simultaneously, advantageously makes it possible to ensure a particularly secure and reliable fastening of the transparent panels and at the same time to reduce the amount of adhesive substance to be used so as to prevent it from being able to dirty the transparent panels and/or to use an adhesive substance having relatively worse characteristics of adhesiveness but that is more cost-effective. Moreover, it should be noted that the fact that an adhesive substance is used to fix the transparent panels, advantageously ensures a relative seal suitable for avoiding or reducing infiltrations of humidity between the transparent panels and the blade structure 7.

Figure 8:
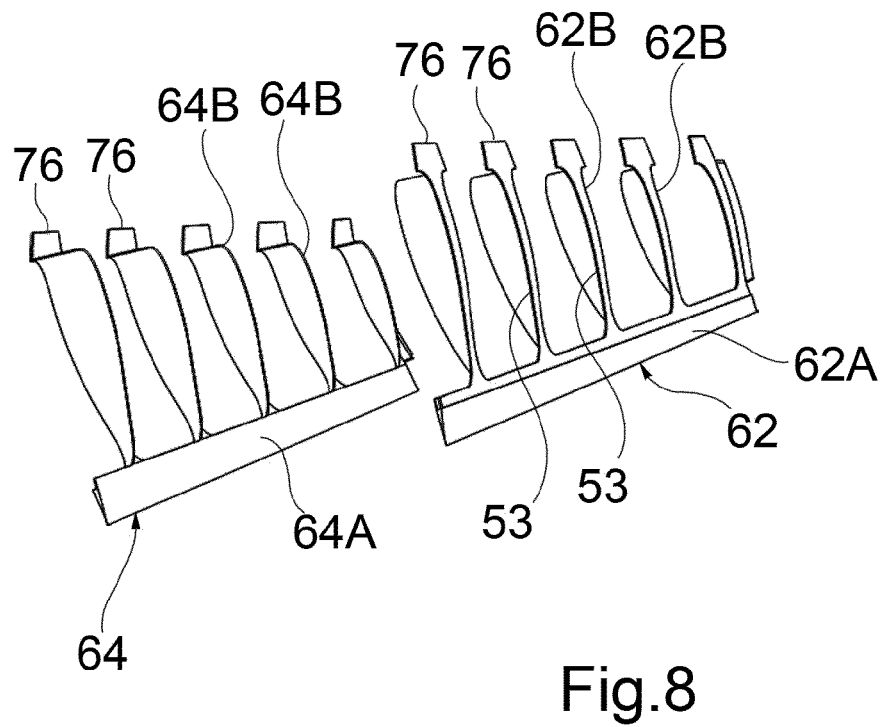
FIG. 8 shows a perspective view of two components of the blade of FIG. 2 decoupled from one another.
Figure 9:
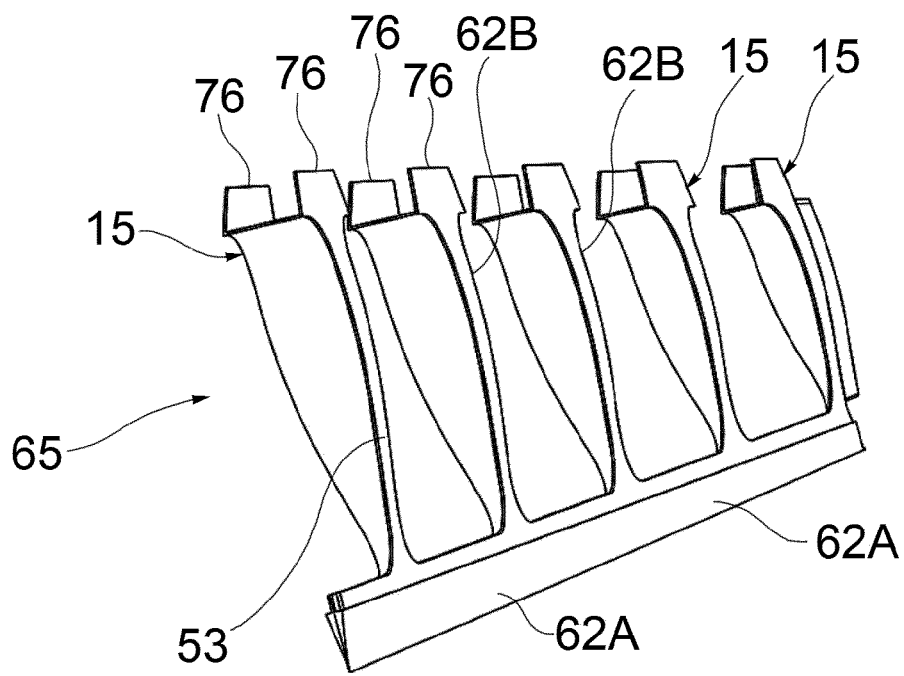
FIG. 9 shows a perspective view of the components of FIG. 8 coupled together.

With reference to FIG. 6, in accordance with a preferred embodiment the blade structure 7 comprises four generally comb-shaped structures 61, 62, 63, 64. Each of such comb-shaped structures 61-64 comprises a comb spine 61A, 62A, 63A, 64A and a plurality of comb teeth 61B, 62B, 63B, 64B that are preferably formed in a single piece with the comb spine and that project transversally from such a spine. The comb-shaped structures 61-64 are coupled with one another in pairs so as to form two segments or pieces of the blade structure 7 that are intended to be connected both to one another and to the longitudinal leading edge portion 13. Regarding this, FIG. 8 represents the comb-shaped structures 62, 64 decoupled from one another. In FIG. 9 the same comb-shaped structures 62, 64 are represented coupled together to form a structure piece or segment 65 of the blade structure 7 that in the example is fixed to the blade tip 11. As can be seen in FIG. 9 the comb-shaped structures 62, 64 are coupled together so that the comb spines 62A, 64A define a part of the longitudinal trailing edge portion 14 (FIG. 7) whereas the comb teeth 62B, 64B define a plurality of the aforementioned reinforcement ribs 15. In other words, the comb-shaped structures 62, 64 are preferably coupled together facing one another so that the comb spine 62A faces the comb spine 64A and each comb tooth 62B faces a corresponding comb tooth 64B. The comb-shaped structures 61, 63 (FIG. 6) are coupled together in an analogous way to the comb-shaped structures 62, 64 so as to form a further structure piece or segment (not represented in the figures) of the blade structure 7 that is analogous to the structure segment 65. It should be noted that the fact that comb-shaped structures are provided in which the comb teeth are made in one piece with the comb spines advantageously makes it possible to obtain a particularly strong blade structure that makes it possible to compensate for the structural weakening of the blade due to the fact that the aforementioned transparent panels, made for example from polycarbonate, are used. Moreover, it should be noted that such comb-shaped structures allow to assemble the blade in a particularly easy way.

With reference to FIGS. 2-4, in accordance with a preferred embodiment, the longitudinal leading edge portion 13 comprises a longitudinal tubular member 13. As can be seen in FIG. 3, according to an advantageous embodiment the tubular member 13 has a cross-section profile shaped as a closed loop comprising a pair of steps 71, 72 situated on two opposite sides of the member to define the aforementioned suction side 50 and pressure side fastening seats. More specifically, the steps 71, 72 are used to at least partially define respectively the longitudinal surface portion 51 and an opposite longitudinal surface portion of the pressure side fastening seat. With reference to FIGS. 3-4, it can be seen that according to an embodiment the longitudinal trailing edge portion 14 has a cross section profile shaped essentially like an arrow. In other words, as can be seen in FIGS. 3-4, also the longitudinal trailing edge portion 14 has a cross section comprising a pair of steps situated on two opposite sides of the longitudinal trailing edge portion 14. Again, with reference to FIGS. 3-4, it should be noted that the fact of providing a longitudinal tubular member having a cross-section profile shaped as a closed loop comprising a pair of steps arranged on two opposite sides of the longitudinal tubular member and a longitudinal trailing edge portion which has a cross section profile which is shaped essentially like an arrow, allows to carry out a blade with transparent inserts (i.e. the suction side panel and pressure side panel) which partially define the airfoil suction side and the airfoil pressure side, respectively, instead of a blade having two transparent half shells completely defining the airfoil pressure side and the airfoil suction side, respectively. Moreover, it should be noted that the fact of providing a longitudinal tubular member having a cross-section profile shaped as a closed loop allows for a compensation of the weakening of the support structure due to the use of the above mentioned transparent inserts instead of two continuous transparent half shells.

Figure 10:
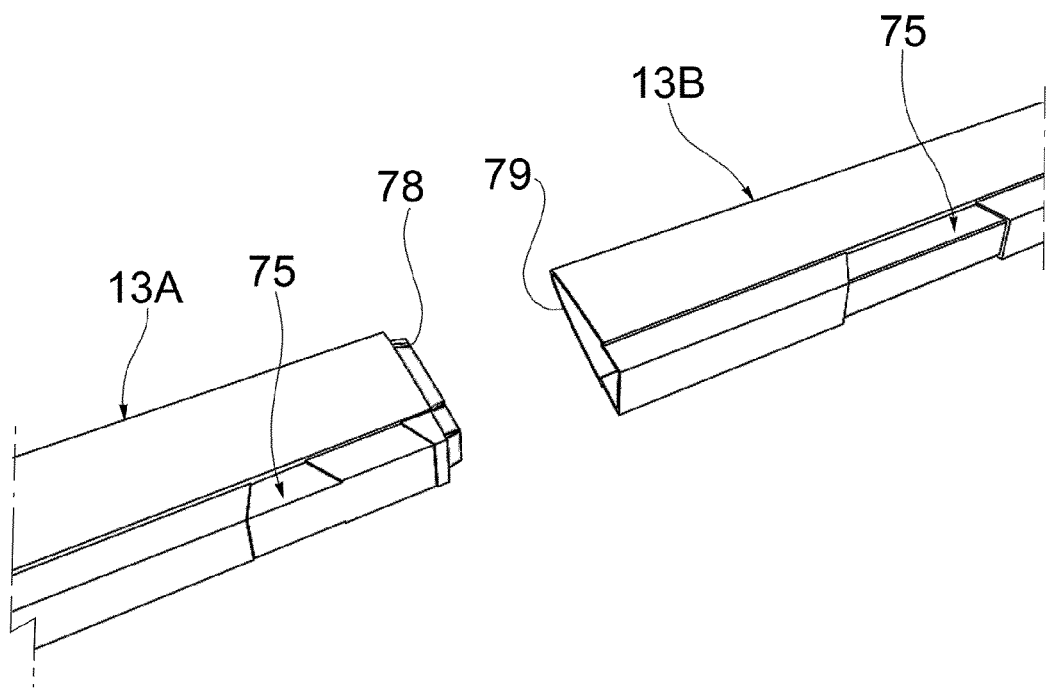
FIG. 10 shows a partial perspective view of two further components of the blade of FIG. 2 decoupled from one another.

With reference to FIGS. 6 and 10, in accordance with a preferred embodiment the longitudinal tubular member 13 comprises a plurality of fastening recesses 75 to fix the aforementioned two structure pieces to the tubular member 13. In particular, in the fastening recesses 75 corresponding fastening fins 76 (FIGS. 8 and 9) of the comb teeth 61B-64B are received and fixed, so that the fastening fins 76 at least partially define two of the aforementioned longitudinal surface portions belonging, respectively, to the suction side fastening seat 50 (FIG. 7) and to the pressure side fastening seat. Preferably, each of the comb teeth 61B, 62B, 63B, 64B is equipped with a respective fastening fin 76 at a respective end portion distal from the comb spine 61A, 62A, 63A, 64A.

Again with reference to FIGS. 6 and 10, in accordance with a preferred embodiment the longitudinal tubular member 13 comprises a first and a second tubular segment 13A, 13B that are connected together to form the member 13. As can be seen in FIG. 10, the tubular segment 13A comprises a respective sleeve end portion 78 that is suitable for fitting in a conjugated end portion of the tubular segment 13B. The portion 79 is conjugated with respect to the portion 78 to couple together such tubular segments 13. In the example, in which the blade tip 11 is also a hollow member, the tubular segment 13B preferably comprises a further sleeve end portion similar to the end portion 78 to couple the tubular segment 13B with the blade tip 11. According to an embodiment, the aforementioned two structure pieces or segments can be fixed together at mutually facing ends of the coupled comb spines 62A, 64A and 61A, 63A. For example, such ends of the coupled comb spines can for example be glued together at the end and/or can be equipped with coupling portions analogous to the portions 78 and 79.

Figure 11:
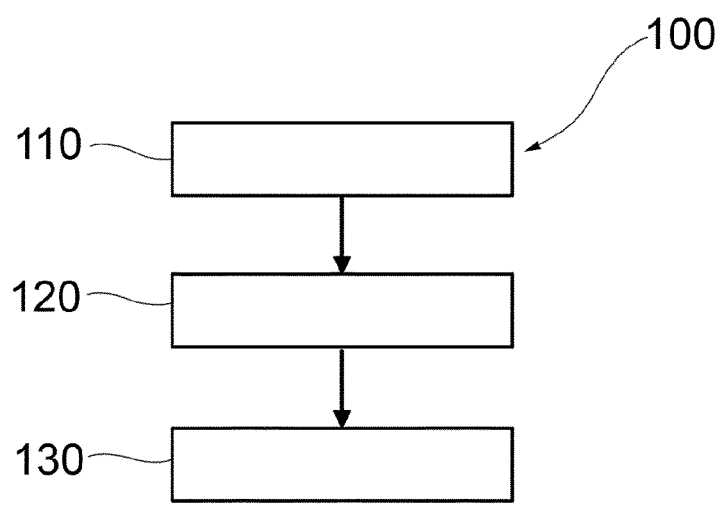
FIG. 11 shows a flow chart of a method for assembling a blade for a wind turbine generator according to a currently preferred embodiment.

It should be noted that based on the structure of the blade 6 described above, an assembly method 100 (FIG. 11) for assembling a blade for a wind turbine generator 1 has in practice been described. In accordance with a preferred embodiment, the assembly method 100 comprises a step 110 of providing a blade structure 7 longitudinally extending along a blade axis X1 and delimiting at least one transparent region 40. The blade structure comprises a blade tip 11, an opposite blade root 12, a longitudinal leading edge portion 13 and a longitudinal trailing edge portion 14 that extend between the blade root 12 and the blade tip 11.

The assembly method 100 also comprises a step 120 of providing a suction side panel 31 and a pressure side panel 33 made from a transparent material and a step 130 of fixing such transparent panels 31, 33 to the blade structure 7 arranged facing one another. The transparent region 40 is arranged between the transparent panels 31, so that it is possible to see through the blade 6 looking through the transparent panels 31, 33 and the transparent region 40.

The transparent panels 31, 33 are such as to define, together with the blade structure 7, an outer aerodynamic shell 20. The aerodynamic shell 20 defines an airfoil 25 including an airfoil leading edge 26, a airfoil trailing edge 27 and a airfoil suction side and a airfoil pressure side 28, 29 between said airfoil leading and trailing edges 26, 27. The transparent panels 31, 33 are fixed to the blade structure 7 so as to at least partially define the airfoil suction side 28 and the airfoil pressure side 29, respectively.

In accordance with a preferred embodiment, the step 110 of providing the blade structure 7 comprises an operation of providing a pair of generally comb-shaped structures 62, 64 each comprising a comb spine 62A, 64A and a plurality of comb teeth 62B, 64B that are formed in a single piece with the comb spine 62A, 64A and that project transversally from such a spine 62A, 64A.

Moreover, step 110 of providing the blade structure 7 comprises an operation of coupling together the aforementioned comb-shaped structures 62, 64 so that the comb spines 62A, 64A at least partially define the longitudinal trailing edge portion 14 whereas the comb teeth 62B, 64B define a plurality of the aforementioned reinforcement ribs 15. In accordance with a preferred embodiment before the operation of coupling together the comb-shaped structures 62, 64, the step 110 comprises an operation of arranging the comb-shaped structures 62, 64 facing one another so that the comb spine 62A faces the comb spine 64A and each comb tooth 62B faces a corresponding comb tooth 64B.

In accordance with a preferred embodiment of the assembly method 100, the comb teeth 62B, 64B comprise fastening fins 76. Moreover, the longitudinal leading edge portion 13 preferably comprises a plurality of fastening recesses 75 and the blade structure 7 comprises a suction side fastening seat 50 and a pressure side fastening seat situated, respectively, on the suction side and on the pressure side of the blade 6 to fix the transparent panels 31, 33 to the blade structure 7. The step 110 of providing the blade structure 7 preferably comprises an operation of inserting the fastening fins 76 in the fastening recesses 75 to couple the comb-shaped structures 62, 64 with the longitudinal leading edge portion 13. In particular, the fastening fins 76 are preferably received in the fastening recesses 75 so as to at least partially define two longitudinal surface portions (only the longitudinal surface portion 51 of which is visible in FIG. 7) belonging to the suction side fastening seat 50 and to the pressure side fastening seat, respectively.

In accordance with a preferred embodiment, the step 110 of providing the blade structure 7 comprises an operation of providing a first tubular segment 13A having a sleeve end portion 78 and an operation of providing a second tubular segment 13B having a conjugated end portion 79 that is conjugated with respect to the sleeve portion 78. Moreover, the step 110 of providing the blade structure 7 preferably comprises an operation of fitting the sleeve end portion 78 in the conjugated end portion 79 to couple together the first and the second tubular segments 13A, 13B so as to form a longitudinal tubular member 13 that is suitable for defining the longitudinal leading edge portion 13. In accordance with a preferred embodiment, before the aforementioned operation of fitting the sleeve portion 78 in the conjugated portion 79, the step 110 comprises an operation of arranging an adhesive substance, like for example an epoxy resin, on the sleeve portion 78.

In accordance with a preferred embodiment the step 130 of fixing the transparent panels 31, 33 comprises an operation of using a first type of fastening elements and an operation of using a second type of fastening elements 55 different from the first type of fastening elements to fix each of the transparent panels 31, 33 to the blade structure 7. In particular, the fastening elements of the first type preferably comprise an adhesive substance, like for example an epoxy resin.

It should be noted that numerous modifications and/or variants can be brought to a blade for a wind turbine generator and/or to an assembly method according to the present description.

For example, by making the blade structure 7 from a sufficiently strong material, the blade can be provided with a single transparent region 40 instead of comprising a plurality of transparent regions 40 as described above. Such a transparent region can for example be obtained by removing a plurality of reinforcement ribs 15 so that the transparent region is delimited for example by the blade tip 11, by the blade root 12 and by the longitudinal leading and trailing edge portions 13, 14. It should also be noted that according to a less advantageous embodiment, the transparent region 40 could also comprise a transparent material instead of being formed from a cavity or from a through opening.

In accordance with further variant embodiments, according to the dimensions of the blade, the number of transparent panels and/or the number of comb-shaped structures and/or the number of tubular segments that form the longitudinal tubular member can be different, and more specifically either more or less, with respect to those indicated above.

For example, in general it is necessary for the blade 6 to comprise at least one suction side panel and at least one pressure side panel made from a transparent material.

In accordance with a variant embodiment, the blade 6 can comprise a longitudinal tubular member 13 that comprises a single tubular segment connected to the blade root and to the blade tip, respectively, thus without needing to foresee a plurality of tubular segments connected together.

In accordance with a variant embodiment, the blade structure can comprise a single pair of comb-shaped structures suitable for being coupled together to form a single piece suitable for being coupled together to form a single piece of structure connected to the longitudinal leading edge portion and to the blade tip, respectively.

Based on what has been described above, it is therefore possible to understand how a blade for a wind turbine generator and a method for assembling such a blade according to the present description allow the aforementioned objectives to be attained.

The fact that a blade for a wind turbine generator is provided that is at least partially transparent, indeed advantageously makes it possible to see the environment beyond the blades through the blades themselves, in this way reducing the visual impact of the wind turbine generator and thus allowing it to blend in better with the surrounding environment with respect to wind turbine generators of the prior art.

Without affecting the principle of the invention, the embodiments and the details can be widely varied with respect to what has been described and illustrated purely as a non-limiting example, without for this reason departing from the scope of the invention as defined in the attached claims.

The invention claimed is:

1. A blade for a wind turbine generator for converting wind energy into electric energy, comprising:
    a blade structure longitudinally extending along a blade axis (X1) and comprising a blade tip, an opposite blade root, a longitudinal leading edge portion and a longitudinal trailing edge portion which are extended between the blade root and the blade tip; and
    an outer aerodynamic shell defining an airfoil including an airfoil leading edge, an airfoil trailing edge and an airfoil suction side and an airfoil pressure side between said airfoil leading and trailing edges;
    wherein said outer aerodynamic shell comprises a suction side transparent panel and a pressure side transparent panel which are made from a transparent material and are fastened to the blade structure so as to define the airfoil suction side and the airfoil pressure side, respectively;
    wherein the blade comprises a suction side fastening seat and a pressure side fastening seat arranged on the suction side and pressure side of the blade, respectively, to fasten said transparent panels to the blade structure
    wherein said blade comprises a transparent region between said transparent panels and wherein said transparent panels are arranged facing one another so that it is possible to see through the blade looking through said transparent panels and said transparent region;
    said blade being characterized in that:
    the suction side panel and pressure side panel partially define the airfoil suction side and the airfoil pressure side, respectively;

the longitudinal leading edge portion comprises a longitudinal tubular member, said longitudinal tubular member having a cross-section profile shaped as a closed loop comprising a pair of steps arranged on two opposite sides of the longitudinal tubular member to define said suction side and pressure side fastening seats; and the longitudinal trailing edge portion has a cross section profile which is shaped like an arrow.

2. The blade according to claim 1, wherein said wind turbine generator is a mini-wind turbine generator.

3. The blade according to claim 1, wherein the blade structure comprises a plurality of reinforcement ribs which are spaced apart from each other in the direction of the blade axis (X1) and extend transversally with respect to said blade axis (X1) between the longitudinal leading edge portion and the longitudinal trailing edge portion, said blade comprising a plurality of transparent regions which are arranged adjacent to one another in the direction of the blade axis (X1) and interposed between said transparent panels, each one of said transparent regions being delimited by a pair of adjacent reinforcement ribs and by said longitudinal leading and trailing edge portions.

4. The blade according to claim 3, wherein each of said transparent panels comprises an inner face and an opposite outer face, and wherein each of said fastening seats comprises a fastening surface set back towards the inside of the blade with respect to the outer aerodynamic shell and facing towards the inner face of the respective transparent panel, the fastening surface being fastened to such inner face and comprising:

two longitudinal surface portions extending between the blade tip and the blade root and which are associated or connected to the longitudinal leading edge portion and to the longitudinal trailing edge portion, respectively; and a plurality of transversal surfaces extending transversally with respect to the blade axis (X1) between the longitudinal surface portions.

5. The blade according to claim 3, wherein the blade structure comprises a pair of generally comb-shaped structures each comprising a comb spine and a plurality of comb teeth which are formed in a single piece with the comb spine and transversally projecting from said comb spine, said comb-shaped structures being coupled together facing one another so that the comb spine of one of said comb-shaped structures faces the comb spine of the other one of said comb-shaped structures, and each comb tooth of one of said comb-shaped structures faces a corresponding comb tooth of the other one of said comb-shaped structures, the comb-shaped structures of said pair being mutually coupled in such a way that said comb spines define at least partially the longitudinal trailing edge portion, whereas said comb teeth define a plurality of said reinforcement ribs.

6. The blade according to claim 5, wherein the comb teeth of said comb-shaped structures comprise fastening fins and wherein said longitudinal tubular member comprises a plurality of fastening recesses in which the fastening fins are received and fastened in such a way that the fastening fins define at least partially two longitudinal surface portions respectively belonging to the suction side fastening seat and the pressure side fastening seat.

7. The blade according to claim 1, wherein the longitudinal tubular member comprises a first tubular segment having a sleeve end portion and a second tubular segment having a conjugated end portion with respect to said sleeve end portion, the sleeve end portion being adapted to be fitted in the conjugated end portion to mutually couple said first and second tubular segments.

8. The blade according to claim 1, comprising first fastening elements and second fastening elements different from each other to fasten each of said transparent panels to the blade structure, the fastening elements comprising an adhesive substance.

9. The blade for wind turbine according to claim 1, wherein the blade structure is entirely made from carbon fiber.

10. A wind turbine generator comprising at least one blade as defined in claim 1.

11. A method for assembling a blade for a wind turbine generator for converting wind energy into electric energy, comprising:

a step of providing a blade structure longitudinally extending along a blade axis (X1) and delimiting at least a transparent region, the blade structure comprising a blade tip, an opposite blade root, a longitudinal leading edge portion and a longitudinal trailing edge portion which are extended between the blade root and the blade tip;

a step of providing a suction side panel and a pressure side panel made from a transparent material; and a step of fastening to the blade structure said transparent panels facing each other, said transparent region being interposed between said transparent panels in such a way that it is possible to see through the blade looking through said transparent panels and said transparent region;

wherein the blade comprises a suction side fastening seat and a pressure side fastening seat arranged on the suction side and the pressure side of the blade, respectively, to fasten said transparent panels to the blade structure;

said transparent panels being such as to define together with the blade structure an outer aerodynamic shell, said outer aerodynamic shell defining an airfoil including an airfoil leading edge, an airfoil trailing edge and an airfoil suction side and an airfoil pressure side between said airfoil leading and trailing edges, said transparent panels being fastened to the blade structure so as to define the airfoil suction side and the airfoil pressure side, respectively;

said assembly method being characterized in that:

the suction side panel and pressure side panel partially define the airfoil suction side and the airfoil pressure side, respectively;

the longitudinal leading edge portion comprises a longitudinal tubular member, said longitudinal tubular member having a cross-section profile shaped as a closed loop comprising a pair of steps arranged on two opposite sides of the longitudinal tubular member to define said suction side and pressure side fastening seats; and the longitudinal trailing edge portion has a cross section profile which is shaped like an arrow.

12. The method according to claim 11, wherein said step of providing the blade structure comprises:

an operation of providing a pair of generally comb-shaped structures each comprising a comb spine and a plurality of comb teeth which are formed in single piece with the comb spine and transversally projecting from said comb spine; and an operation of mutually coupling said comb-shaped structures in such a way that said comb-shaped structures are coupled together facing one another so that the comb spine of one of said comb-shaped structures faces the comb spine of the other one of said comb-shaped structures, and each comb tooth of one of said comb-shaped structures faces a corresponding comb tooth of the other one of said comb-shaped structures, said operation of mutually coupling comprising coupling said comb-shaped structures in such a way that said comb spines define at least partially the longitudinal trailing edge portion whereas said comb teeth define a plurality of reinforcement ribs.

13. The method according to claim 12, wherein said comb teeth comprise fastening fins and said longitudinal leading edge portion comprises a plurality of fastening recesses, said step of providing the blade structure comprising an operation of inserting the fastening fins in the fastening recesses to couple said comb-shaped structures to the longitudinal leading edge portion, the fastening fins being received in the fastening recesses in such a way as to define at least partially two longitudinal surface portions belonging to said suction side fastening seat and to said pressure side fastening seat, respectively.

14. The method according to claim 11, wherein said step of providing the blade structure comprises:
- an operation of providing a first tubular segment having a sleeve end portion;
- an operation of providing a second tubular segment having a conjugated end portion with respect to said sleeve portion; and
- an operation of fitting the sleeve end portion in the conjugated end portion to mutually couple said first and second tubular segment in order to form said longitudinal tubular member which is suitable for defining said longitudinal leading edge portion.

* * * * *